Patented Jan. 25, 1944

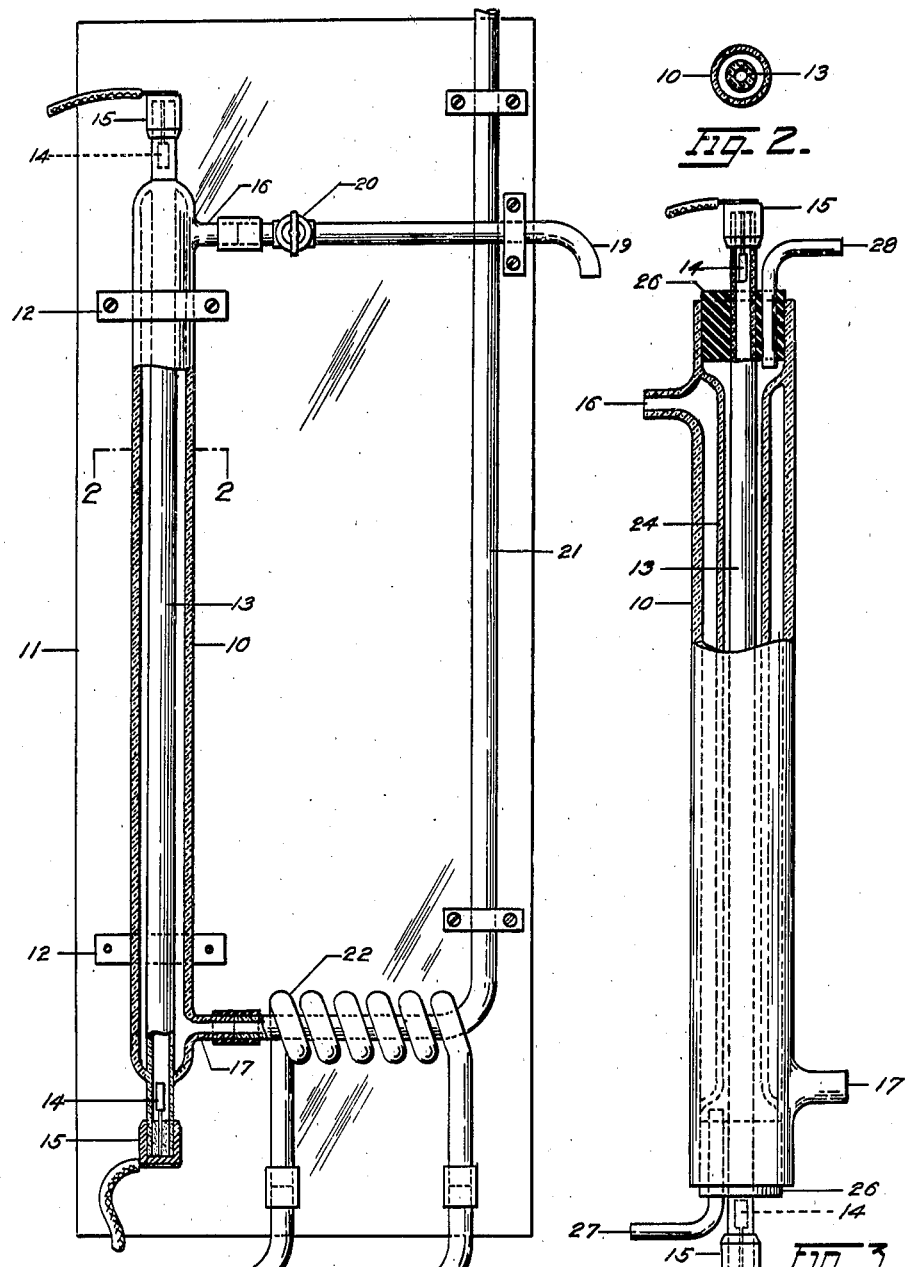

2,339,906

UNITED STATES PATENT OFFICE 2,339,906

APPARATUS FOR IRRADIATING MATERIALS

Richard H. Barnes, Minneapolis, Minn.

Original application July 17, 1939, Serial No. 284,850. Divided and this application October 24, 1939, Serial No. 300,988

1 Claim. (Cl. 250—43)

This invention relates to a method and an apparatus for synthesis of vitamin D. This application is a division of application Serial No. 284,850 filed July 17, 1939.

One object of the invention is to provide a method by means of which vitamin D may be produced of high potency free from deleterious materials. Another object is to provide an apparatus in which provitamin materials may be exposed to ultraviolet light rays. Other objects will be apparent from the following description and the drawing, in which Fig. 1 is an elevation, partly in section, showing one form of apparatus of my invention; Fig. 2 is a sectional view taken on the line 2—2 of Fig. 1; Fig. 3 is an elevation, partly in section, showing another form of irradiating apparatus of my invention.

Referring particularly to Figs. 1 and 2, an irradiating chamber 10 is mounted vertically upon a supporting backboard 11 by means of clamps 12. An ultraviolet generator 13, of the type known commercially as "cold quartz" and consisting of a closed tube of clear quartz or other material transparent to ultraviolet radiations with electrodes 14 in the two ends and containing a little mercury and a mixture of rare atmospheric gases at low pressure, is placed within the irradiating tube or chamber, and preferably sealed thereto at its ends. The electrodes 14 are cemented or sealed through the ends of the tube so that electrical connections may be made at the terminals 15 to suitable sources of electrical energy. Side tubes 16 and 17 permit the entrance and exit of the fluid to be subjected to the ultraviolet radiation of the generator 13.

The upper side tube 16 is connected to a delivery tube 19 having a valve 20 which may be used to control the rate of discharge of treated fluid, and hence its rate of flow in the irradiating chamber 10 and its time of exposure to the ultraviolet radiations from the generator 13. The fluid to be treated is delivered by the tube or pipe 21 to the lower side arm 17 of the chamber 10. A cooling means for the entering fluid is represented as a coil around the tube 21 near the irradiating apparatus, a cooling medium such as cold water or refrigerant being circulated therethrough. Other means for cooling the incoming liquid may be employed, it being necessary to cool the liquid sufficiently so that the heat absorbed by the liquid in its passage over the ultraviolet light generator will not raise it above its boiling temperature, or above the temperature where the material is deleteriously effected. The chamber itself may be cooled by coils or jacket.

In the modification shown in Fig. 3, a concentric tube 24 is interposed between the ultraviolet light generator and the irradiating chamber, this tube 24 being transparent quartz or other material transparent to ultraviolet light. The tube 24 is preferably made integral with or sealed to the outer tube which constitutes the outer wall of the irradiating chamber 10, and the ultraviolet generator tube 13 is conveniently centered within this tube 24 by apertured stoppers 26 at either end. Tubes 27 and 28, also held in holes in the stoppers, provide entrance and exit means for an interposed gas or liquid cooling or screening agent in the space between the irradiating chamber 10 and the ultraviolet light generator. The liquid to be irradiated is circulated in the annular irradiating chamber 10, by means of an entrance side tube 17 and an exit side tube 16, which may be connected as above described under Fig. 1. By provision of the interposed annular space between the generator tube and the irradiating chamber, ultraviolet light of any selected wave lengths may be screened out and absorbed and hence cannot act upon the liquid to be irradiated in the outer chamber 10, or a cooling fluid may be circulated to take away the heat generated by the generator.

My method of producing vitamin D by irradiation of provitamin material in solution may be illustrated by reference to the apparatus described and shown, although obviously other apparatus or modifications of this apparatus may be employed or an enclosed ultraviolet light generator giving out selected wave lengths may be immersed in the dissolved provitamin liquid, in accordance with my method.

Referring, then, for illustration, to the apparatus shown in Fig. 1, I have treated a solution of about 1 part of ergosterol in 100 parts ethyl ether by subjecting it to the ultraviolet light from a cold quartz generator, by passing it through the feed pipe 21, through the precooling coil 22, through the lower side-tube 17, into the irradiating chamber 10, where it came into direct contact with the wall of the cold quartz generator tube, and flowed out through the upper side tube 16, and was collected. By using gravity feeding of the incoming liquid from a reservoir located slightly above the elevation of the treating chamber, the rate of flow could be readily regulated by means of the valve 20 in the exit tube. It is important in starting the operation, that all of the air be removed from the irradiating chamber, for if this air remains, oxygen compounds, including ozone, are produced in the liquid by the action of the ultraviolet light, and the potency of the vitamin D is reduced, and adversely effected as to taste, odor, and presence of deleterious compounds from oxidation of vitamin D.

The cooling of the incoming liquid prevents volatilization and formation of vapors of the provitamin solvent in the apparatus. The concentration of vitamin D which may be produced depends not only upon the nature and the concentration of provitamin present and its rate of circulation in any particular apparatus, but also upon the amount of ultraviolet light energy of suitable wavelength which is absorbed by the provitamin. In one case, using the one-percent ergosterol solution in ethyl ether, 75 cubic centimeters of liquid per minute was passed through the treating chamber. After the treated material was collected and the ether removed in a neutral atmosphere and with little heating, the resulting residue had a vitamin D activity between 400,000 and 600,000 U. S. P. units per gram of material. In another case, using the same apparatus, (having a chamber about 20 inches long and 5/8 inch in diameter and a cold quartz tube 1/4 inch in diameter within it) but doubling the time of exposure to the ultraviolet light, a concentration between 800,000 and 1,000,000 U. S. P. units of vitamin D per gram resulted.

Instead of passing the provitamin solution in direct contact with a cold quartz ultraviolet light generator, and thereby subjecting it to all of the ultraviolet light generated, as well as to some heat from the generator, I may subject the solution to only a selected part of the generated ultraviolet light by providing a screening and cooling jacket around the generator, and passing the provitamin liquid in direct contact with the jacket. This is illustrated by referring to the apparatus shown in Fig. 3 of the drawing. The space between the generator tube and the inner wall of the irradiating chamber may be filled with dead air or gas or liquid, or the fluid may be circulated. When air is used, the short penetrating wave lengths of ultraviolet light acts upon the oxygen to produce ozone, and this ozone then absorbs the ozone-producing wavelengths of ultraviolet light so that the provitamin solution in the outer chamber is subjected only to light free from ozone-producing wavelengths of ultraviolet light. This prevents any formation of peroxides or ozone or oxygen compounds within the vitamin D solution and greatly improves the quality of the product, and permits longer treatment, and hence greater concentration of vitamin D. The cooling effect of the interposed layer of fluid, especially if it is in circulation, also prevents overheating and volatilization of the provitamin and vitamin solutions.

Other solvents which will dissolve provitamin materials of the nature of ergosterol, may be used such as ethyl alcohol, acetone, methyl alcohol, etc., and oils. Natural materials containing provitamin such as vegetable and animal oils may be circulated in direct or indirect contact with the ultraviolet generator as described.

While I have shown and described the apparatus of my invention, and described illustrative examples of my method of irradiation of provitamin materials by passing them in solution in direct contact with ultraviolet light generators of the cold quartz type, as originally generated or after removing undesired wavelengths, I do not wish to be limited thereby, but restrict my invention only insofar as required by the prior art and the spirit of the appended claim.

I claim:

The method of selecting desired ultra-violet light rays generated from a cool quartz-encased ultra-violet light generator comprising passing a current of air in contact with said generator, and removing said air at a rate sufficient to provide only the required amount of oxygen to absorb at least a portion of the ozone-producing rays from said generator.

RICHARD H. BARNES.